United States Patent
Kim

(10) Patent No.: US 7,564,434 B2
(45) Date of Patent: Jul. 21, 2009

(54) LIGHT EMITTING DIODE DRIVING CIRCUIT FOR BACKLIGHT HAVING CONSTANT CURRENT CONTROL FUNCTION

(75) Inventor: Do Hun Kim, Seoul (KR)

(73) Assignee: Samsung Electro-Mechanics Co., Ltd., Kyungki-Do (KR)

( * ) Notice: Subject to any disclaimer, the term of this patent is extended or adjusted under 35 U.S.C. 154(b) by 610 days.

(21) Appl. No.: 11/476,564

(22) Filed: Jun. 29, 2006

(65) Prior Publication Data

US 2007/0001625 A1    Jan. 4, 2007

(30) Foreign Application Priority Data

Jun. 30, 2005    (KR) .................... 10-2005-0058476

(51) Int. Cl.
    *G09G 3/32* (2006.01)
(52) U.S. Cl. ........................... 345/82; 345/102
(58) Field of Classification Search .......... 345/82, 345/83, 76, 102
    See application file for complete search history.

(56) References Cited

U.S. PATENT DOCUMENTS

| | | | | |
|---|---|---|---|---|
| 6,229,833 | B1 * | 5/2001 | Noda et al. | 372/38.09 |
| 6,697,402 | B2 * | 2/2004 | Crawford | 372/38.03 |
| 7,235,954 | B2 * | 6/2007 | Murakami | 323/222 |
| 7,495,397 | B2 * | 2/2009 | Okabe | 315/69.1 |
| 2005/0093792 | A1 * | 5/2005 | Yamamoto et al. | 345/83 |

FOREIGN PATENT DOCUMENTS

| | | |
|---|---|---|
| JP | 2000-262072 A | 9/2000 |
| JP | 2001-85182 A | 3/2001 |

OTHER PUBLICATIONS

"LEDs Vs. CCFL" Micrel Application Note 40, Aug. 31, 2002. p. 1-3.

* cited by examiner

*Primary Examiner*—Ricardo L Osorio
(74) *Attorney, Agent, or Firm*—McDermott Will & Emery LLP

(57) ABSTRACT

An LED driving circuit of a backlight unit includes a switch connected between an input of direct voltage and a ground to switch the direct voltage according to a switching pulse; a rectifying diode connected between a connecting node and one terminal of the LED array to rectify driving voltage supplied according to switching operation of the switch; a smoothing capacitor having one terminal connected to a cathode of the rectifying diode and the other terminal connected to a ground; a voltage detecting resistor connected between the other terminal of the LED array connected to the ground and the other end of the smoothing capacitor to detect voltage from the current flowing to the ground; and a PWM controlling part for controlling on/off status of the switching according to the switching pulse, wherein the switching pulse has a duty ratio determined according to a preset internal reference voltage and the voltage detected by the voltage detecting resistor. The driving current of can be controlled at a constant current and thus be stabilized.

6 Claims, 7 Drawing Sheets

LIGHT EMITTING DIODE DRIVING CIRCUIT FOR BACKLIGHT HAVING CONSTANT CURRENT CONTROL FUNCTION

CLAIM OF PRIORITY

This application claims the benefit of Korean Patent Application No. 2005-58476 filed on Jun. 30, 2005, in the Korean Intellectual Property Office, the disclosure of which is incorporated herein by reference.

BACKGROUND OF THE INVENTION

1. Field of the Invention

The present invention relates to a backlight unit in use for an LCD panel, and more particularly, to an LED driving circuit of a backlight unit which has an improvement in driving current detection, by which driving current of a light source of the backlight unit such as LEDs can be controlled at a constant current and thus be stabilized.

2. Description of the Related Art

In general, a backlight source for a Liquid Crystal Display (LCD) panel such as an LCD TV and LCD monitor uses a light-emitting device such as a Cold Cathode Fluorescent Lamp (CCFL) and a Light Emitting Diode (LED).

The CCFL has some drawbacks such as environmental contamination due to mercury gas contained therein, low response rate of about 15 ms, low color reproducibility and inaptness to a light-weighted and small-sized LCD panel.

To the contrary, the LED has various merits such as environmental friendless, rapid response rate of several nano seconds, which enables high speed response and makes the LED suitable to video signal stream processing, capability of impulsive action, high color reproducibility of substantially 100%, change in brightness and color temperature through the adjustment of light quantity of red, green and blue LEDs and aptness to a light-weighted and small-sized LCD panel. At present, LEDs with such merits are actively adopted as a backlight source of an LCD panel and so on.

In a backlight unit in use for such an LCD panel, a light source includes a plurality of LEDs connected in series, where a forward voltage offset exists in the LEDs. So, a constant voltage driver or driving circuit is necessary to drive the LEDs connected in series at a constant current.

Such a driving circuit for driving the LEDs that is a light source of a backlight unit for an LCD panel may be constructed of a buck type or boost type DC-DC converter.

Such an LED driving circuit of a backlight unit in use for an LCD panel adopting a PWM boost type DC-DC converter is illustrated in FIG. 1.

In the conventional LED driving circuit of a backlight unit as shown in FIG. 1, an anode of a diode D is connected through an inductor L to an input of direct voltage Vin, and a smoothing capacitor C and an LED array 11 including a plurality of LEDs are connected in parallel between a cathode of the diode D and a ground. A switch SW is connected between the ground and a node N that connects the inductor L with the diode D. The switch SW is constructed of a Metal Oxide Semiconductor (MOS) transistor, and a voltage-detecting resistor Rs is connected between the source of the MOS transistor and the ground.

A voltage Vs detected by the voltage detecting resistor Rs is inputted to a Pulse Width Modulation (PWM) controller 10, which in turn controls on/off duty ratio of a switching pulse according to the magnitude of the detection voltage Vs and outputs the controlled voltage to the gate of the MOS transistor, that is, the switch SW. Such PWM control using a switching pulse will be described below with reference to FIG. 2.

FIG. 2 illustrates a PWM control timing chart of the conventional LED driving circuit of a backlight unit in use for an LCD panel.

Referring to (a) to (c) of FIG. 2, when the detection voltage Vs is substantially the same as internal reference voltage, the PWM controller 10 outputs a switching pulse SP with a duty ratio of approximately 50%, as shown in FIG. 2(a), to the switch SW. If the detection voltage Vs is larger than the internal reference voltage, a switching pulse SP with a duty ratio over 50%, as shown in FIG. 2(b), is outputted to the switch SW. Furthermore, if the detection voltage Vs is smaller than the internal reference voltage, a switching pulse SP with a duty ratio under 50%, as shown in FIG. 2(c), is outputted to the switch SW.

According to such switching pulses SP, when the switch SW is on, current originating from the direct voltage Vin flows through the inductor L and the switch SW, in which energy is stored in the inductor L. When the switch SW is off, the sum of energy of the direct voltage Vin and that stored in the inductor L is transferred to the LED array 11 through the diode D. Here, the voltage transferred to the LED array 11 is smoothed by the smoothing capacitor C, and its value is the same as or larger than input voltage.

Such PWM control is carried out based on the detection voltage Vs, which is detected at the voltage detecting resistor Rs, which in turn detects voltage from driving current supplied to the LED array 11. Such driving current detected by the voltage detecting resistor Rs will be described below with reference to FIG. 3.

FIG. 3 illustrates a driving current detection timing chart of the conventional LED driving circuit of a backlight unit in use for an LCD panel.

As shown in FIG. 3, when the switch SW is on, current originating from the direct voltage Vin is detected at the switch SW when flows through it. However, when the switch SW is off, current is not detected. When the switch SW is on, as time goes on, energy stored in the inductor and the capacitor makes increasingly more current flow through the switch. As shown in FIG. 3, such current shows a triangular waveform.

However, such driving current detection by the conventional LED driving circuit of a backlight unit in use for an LCD panel has following drawbacks. That is, in the switch-on status, current rises with a specific slope and then drops sharply, and in the switch-off status, current does not flow through the voltage detecting resistor Rs. As a result, current detection intervals alternate with no-detection intervals, leaving a series of detection blanks. Then, precise current detection can be carried out hardly and thus output current can be rarely maintained at a constant value.

SUMMARY OF THE INVENTION

The present invention has been made to solve the foregoing problems of the prior art and it is therefore an object of the present invention to provide an LED driving circuit of a backlight unit in use for an LCD panel, which has an improvement in driving current detection, by which driving current of a light source of the backlight unit such as LEDs can be controlled at a constant current and thus be stabilized.

According to an aspect of the invention for realizing any of the foregoing objects, there is provided an LED driving circuit of a backlight unit for driving an LED array which includes a plurality of LEDs connected in series, comprising: a switch connected between an input of direct voltage and a ground to switch the direct voltage according to a switching pulse; a rectifying diode connected between a connecting node and one terminal of the LED array to rectify driving voltage supplied according to switching operation of the switch, the connecting node connecting the input of the direct voltage with the switch; a smoothing capacitor having one terminal connected to a cathode of the rectifying diode and the other terminal connected to a ground; a voltage detecting resistor connected between the other terminal of the LED array connected to the ground and the other end of the smoothing capacitor to detect voltage from the current flowing to the ground; and a PWM controlling part for controlling on/off status of the switching according to the switching pulse, wherein the switching pulse has a duty ratio determined according to a preset internal reference voltage and the voltage detected by the voltage detecting resistor.

Preferably, the switch comprises an MOS transistor having a drain connected to the input of the direct voltage, a source connected to the ground and a gate for receiving the switching pulse.

Preferably, the PWM controlling part includes: a comparator for comparing the preset internal reference voltage with the voltage detected by the voltage detecting resistor; and a controller for determining the duty ratio according to a comparison result by the comparator and providing the switching pulse having the determined duty ratio to the gate of the MOS transistor.

Preferably, the voltage detecting resistor has a connecting terminal connected to the other terminal of the smoothing capacitor and to a detecting terminal of the PWM controlling part to detect current flowing through the MOS transistor to the ground.

Preferably, the voltage detecting resistor has a connecting terminal connected to the other terminal of the smoothing capacitor and to a detecting terminal of the PWM controlling part to detect current flowing through the smoothing capacitor to the ground.

Preferably, the voltage detecting resistor has a connecting terminal connected to the other terminal of the smoothing capacitor and to a detecting terminal of the PWM controlling part to detect current flowing through the MOS transistor to the ground when the MOS transistor is on and to detect current flowing through the smoothing capacitor to the ground when the MOS transistor is off.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENT

Preferred embodiments of the present invention will now be described more fully hereinafter with reference to the accompanying drawings, in which the similar reference signs are used to designate the similar components throughout.

Figure 1:
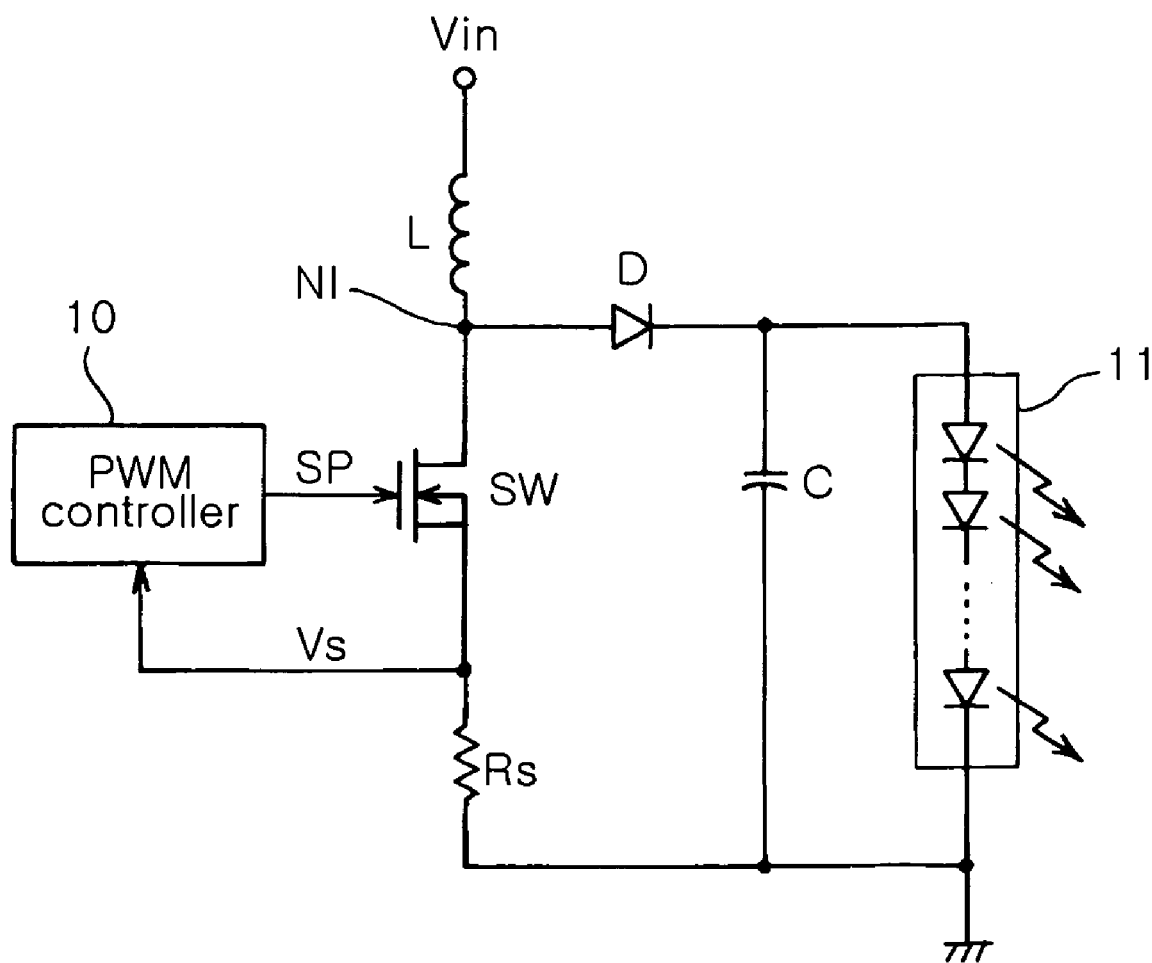
FIG. 1 is a circuit diagram illustrating a conventional LED driving circuit of a backlight unit in use for an LCD panel.
Figure 2:
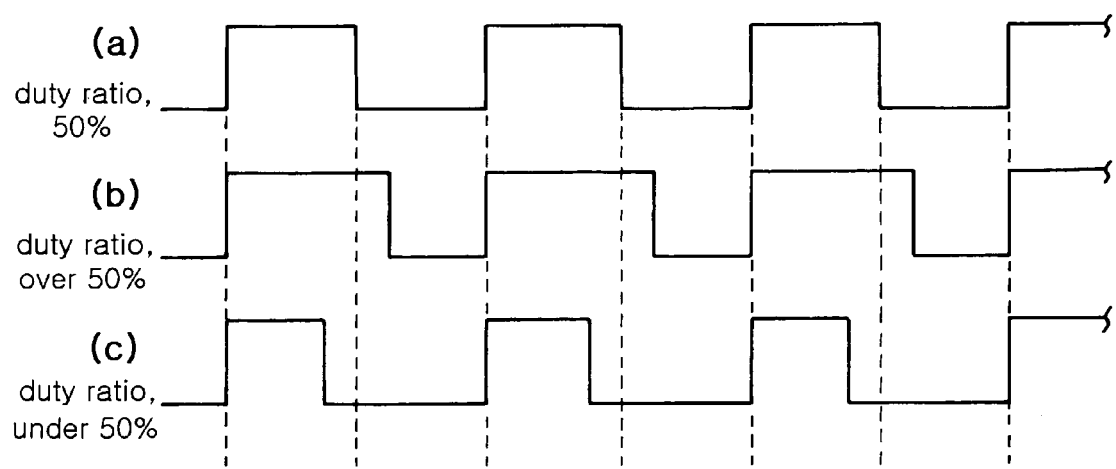
FIG. 2 illustrates a PWM control timing chart of the conventional LED driving circuit of a backlight unit in use for an LCD panel.
Figure 3:
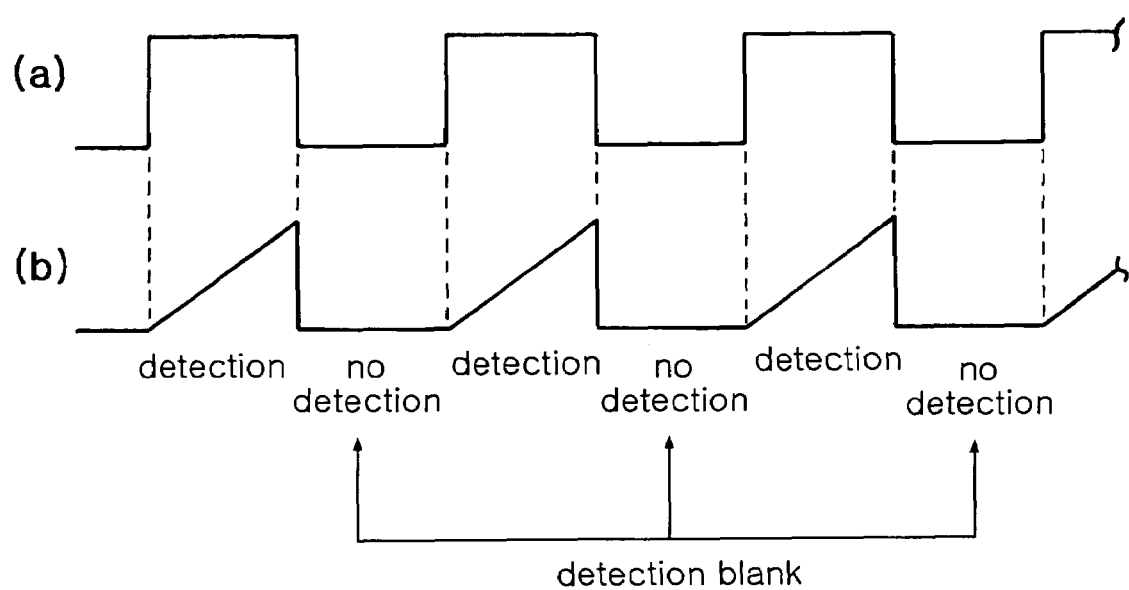
FIG. 3 illustrates a driving current detection timing chart of the conventional LED driving circuit of a backlight unit in use for an LCD panel.
Figure 4:
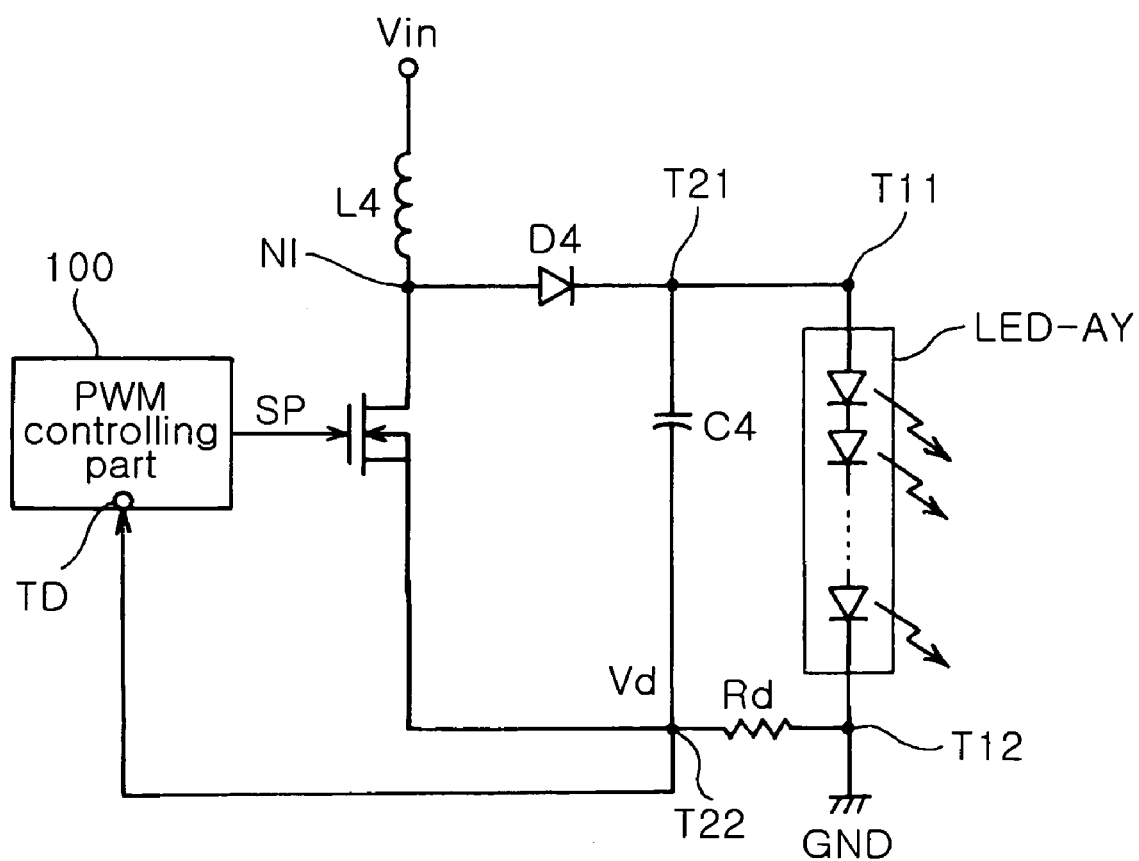
FIG. 4 is a circuit diagram illustrating an LED driving circuit of a backlight unit according to the invention.

FIG. 4 shows an LED driving circuit of a backlight unit according to the invention.

Referring to FIG. 4, the LED driving circuit of a backlight unit of the invention is a circuit for driving an LED array LED-AY including a plurality of LEDs connected in series, and includes a switch SW4, a rectifying diode D4, a smoothing capacitor C4, a voltage detecting resistor Rd and a PWM controlling part 100.

The switch SW4 is connected between an input of direct voltage Vin and a ground GND. The switch SW4 switches the direct voltage Vin according to a switching pulse SP. In this embodiment of the invention, the switch SW4 is constructed of an MOS transistor having a drain connected to the input of the direct voltage Vin, a source connected to the ground GND and a gate for receiving the switching pulse SP.

The rectifying diode D4 is connected between one terminal T11 of the LED array LED-AY and a node N connecting the input of the direct voltage Vin and the switch SW4. The rectifying diode D4, in response to the switching operation of the switch SW4, rectifies driving voltage supplied and outputs such rectified voltage to the LED array LED-AY.

The smoothing capacitor C4 has one terminal T1 connected to a cathode of the rectifying diode D4 and the other terminal T22 connected to the ground GND. The smoothing capacitor C4 functions to smooth driving voltage rectified by the rectifying diode D4.

The voltage detecting resistor Rd is connected between the other terminal T12 of the LED array LED-AY connected to the ground GND and the other terminal T22 of the smoothing capacitor C4. The voltage detecting resistor Rd detects voltage Vd from the current flowing to the ground GND.

The PWM controlling part 100 performs on/off control over the switch SW4 by using the switching pulse SP having a duty ratio determined according to the voltage Vd detected by the voltage detecting resistor Rd.

Figure 5:
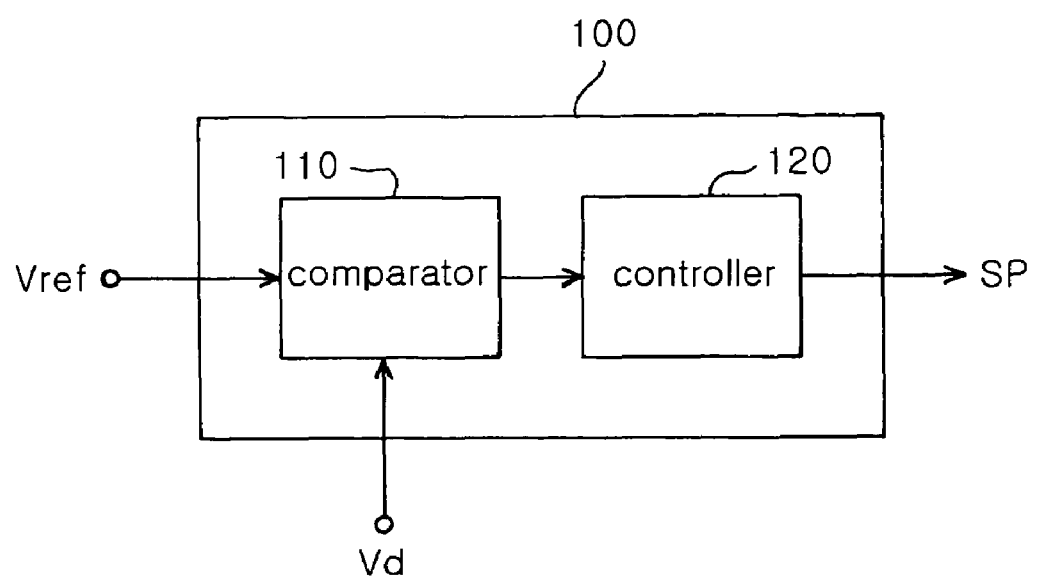
FIG. 5 is an internal block diagram of a PWM controlling part shown in FIG. 4.

FIG. 5 illustrates an internal block of the PWM controlling part 100 shown in FIG. 4.

Referring to FIG. 5, the PWM controlling part 100 includes a comparator 110 for comparing a preset internal reference voltage Vref with the voltage Vd detected by the voltage detecting resistor Rd and a controller 120 for determining a duty ratio based on comparison result by the comparator 110 and supplying a switching pulse SP having the determined duty ratio to the gate of the MOS transistor.

Referring to FIGS. 4 and 5, the voltage detecting resistor Rd has a connecting terminal which is connected to the other terminal T22 of the smoothing capacitor C4 and thereby to a detecting terminal TD of the PWM controlling part 100. The voltage detecting resistor Rd detects current flowing to the ground GND through the MOS transistor, and when the MOS transistor is off, detects current flowing to the ground GND through the smoothing capacitor C4.

Figure 6:
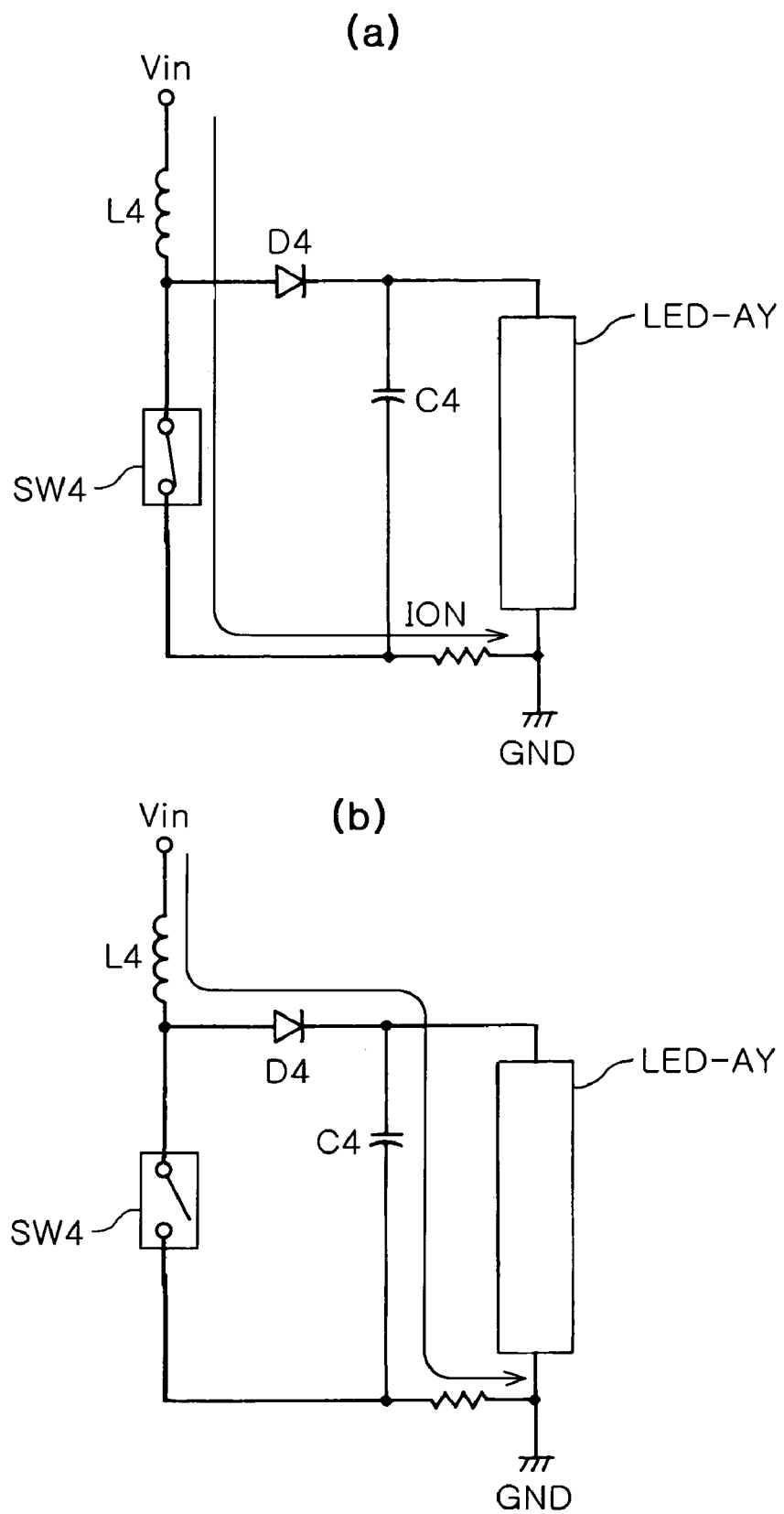
FIG. 6 is a conceptual view illustrating driving current detection by the LED driving circuit of a backlight unit according to the invention.

FIG. 6 is a conceptual view illustrating driving current detection by the LED driving circuit of a backlight unit according to the invention.

FIG. 6(a) shows a path of current ION flowing to the ground GND through the switch SW4, whereas FIG. 6(b) shows a path of current IOFF flowing to the ground GND through the smoothing capacitor C4.

Figure 7:
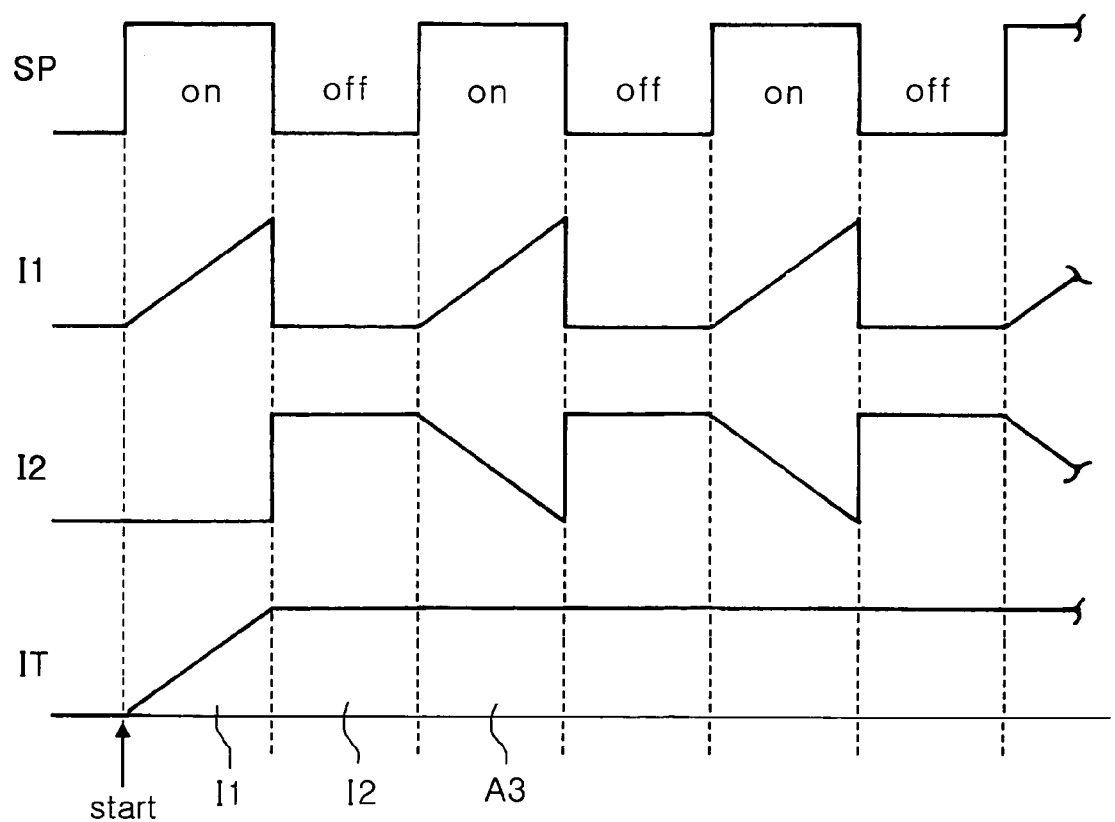
FIG. 7 illustrates driving current detection timing charts of the LED driving circuit of a backlight unit according to the invention.

FIG. 7 is timing charts illustrating driving current detection by the LED driving circuit of a backlight unit according to the invention.

In FIG. 7, SP indicates a switching pulse timing chart, ION indicates a timing chart of current flowing through the voltage detecting resistor Rd when the switch is on, IOFF indicates a timing chart of current flowing through the voltage detecting resistor Rd through the smoothing capacitor C4, and IT indicates entire current that is the sum of current at switch-on added with current at switch-off.

A detailed description will now be given of the operation and effects of the invention.

The LED driving circuit of the backlight unit of the invention is applied to a backlight unit of an LCD panel. Such backlight unit to which the LED driving circuit of the invention is applicable includes an LED array having a plurality of LEDs connected in series. The LED driving circuit of the invention can provide constant current control to stabilize driving current of the LED array so that the LED array can operate stably. Such an operation will be described as follows.

Referring to FIGS. 4 to 8, the PWM controlling part 100 of the LED driving circuit of the invention performs on/off control over the switch SW4 in a PWM mode, that is, controls the switch SW4 in a PWM mode according to the difference between an internal reference voltage and a detection voltage. Particularly, the PWM controlling part 100 controls pulse width to be wide if the detection voltage is lower than the reference voltage, but controls pulse width to be narrow if the detection voltage is higher than the reference voltage, thereby to keep driving current at a constant value.

Such PWM control requires the voltage to be detected more precisely without detection blank or skipping in order to control the driving current at a constant value, and the LED driving circuit of the invention can detect the driving current as continuous linear current without detection blank as described below.

The switch SW4 of the invention is connected between the input of the direct voltage Vin and the ground GND to switch the direct voltage Vin according to the switching pulse SP from the PWM controlling part 100. Here, the switch SW4 may be constructed of an MOS transistor having a drain connected to the terminal of the direct voltage Vin, a source connected to the ground GND and a gate for receiving the switching pulse SP. For example, in a high level (or ON) interval of the switching pulse SP, the switch SW4 is on so that current originating from the direct voltage Vin flows to the ground GND through the switch SW4.

Furthermore, in a low level (OFF) interval of the switching pulse SP, the switch SW4 is off so that a portion of the current originating from the direct voltage Vin flows to the LED array LED-AY through the rectifying diode D4 and another portion of the current flows to the ground GND through the smoothing capacitor C4.

The rectifying diode D4 of the invention is connected between the node N, which connects the input of the direct voltage Vin with the switch SW4, and the terminal T11 of the LED array LED-AY to rectify the driving current supplied according to the switching of the switch SW4 and supply it to the LED array LED-AY. Here, the smoothing capacitor C4 of the invention smoothes the driving current flowing from the rectifying diode D4 to the LED array LED-AY so that a constant current can flows through the LED array LED-AY.

According to such on/off operation of the switch under PWM control, the plurality of LEDs of the LED array LED-AY operate and thus act as a backlight source of the LED panel.

In such operation, the voltage detecting resistor Rd of the invention is connected between the terminal T12 of the LED array LED-AY, which is connected to the ground GND, and the terminal T22 of the smoothing capacitor C4 to detect voltage from the current flowing through the ground GND and supply the detection voltage to the detecting terminal TD of the PWM controlling part 100.

Here, as described above, the PWM controlling part 100 performs on/off control over the switch SW4 by using the switching pulse SP having a duty ratio determined according to the voltage Vd detected by the voltage detecting resistor Rd.

Referring to FIG. 5, the comparator 110 of the PWM controlling part 100 compares a preset internal reference voltage Vref with the detection voltage Vd detected by the voltage detecting resistor Rd and outputs a comparison result to the controller 120, which in turn determines the duty ratio based on the comparison result by the comparator 110 and supplies a switching pulse SP having the determined duty ratio to the gate of the MOS transistor.

For example, if the detection voltage Vd is substantially the same as the internal reference voltage Vref, a switching pulse having a duty ratio of approximately 50% is outputted to the switch SW4. If the detection voltage Vd is larger than the internal reference voltage Vref, a switching pulse with a duty ratio over 50% is outputted to the switch SW4. Furthermore, if the detection voltage Vd is smaller than the internal reference voltage Vref, a switching pulse with a duty ratio under 50% is outputted to the switch SW4.

Through such PWM control, the driving current flowing through the LED array can be controlled at a constant value.

However, in such PWM control, when a detection voltage is unstable or a detection blank exists as in the conventional LED driving circuit of a backlight unit, the driving current flowing through the LED array cannot be detected reliably. Then, PWM control becomes unstable and the driving current flows irregularly through the LED array.

To the contrary, the LED driving circuit of a backlight unit of the invention can detect the driving voltage flowing through the LED array as continuous linear current without any detection blank and thus obtain more precise detection results on the driving current flowing through the LED array. As a result, PWM control can be performed stable and the driving current flows through the LED array at a constant value.

Referring to (a) of FIG. 6, the connecting terminal of the voltage detecting resistor Rd is connected to the other terminal T22 of the smoothing capacitor C4 and thereby to the detecting terminal TD of the PWM controlling part 100 so that the voltage detecting resistor Rd can detect current ION flowing to the ground GND through the MOS transistor and output it to the detecting terminal TD of the PWM controlling part 100.

Referring to (b) of FIG. 6, the voltage detecting terminal Rd detects current IOFF flowing to the ground GND through the smoothing capacitor C4 and outputs it to the detecting terminal TD of the PWM controlling part 100.

Referring to (a) and (b) of FIG. 6, the voltage detecting terminal Rd has the connecting terminal connected to the other terminal T22 of the smoothing capacitor C4 and to the detecting terminal TD of the PWM controlling part 100. With this configuration, the voltage detecting terminal Rd can detect the current ION flowing to the ground GND through the MOS transistor when the MOS transistor is on, and detect the current IOFF flowing to the ground GND through the smoothing capacitor C4 when the MOS transistor is off.

With this embodiment of the invention, the driving current flows constantly through the voltage detecting resistor Rd regardless of on/off status of the switch, and thus there is no detection blank.

When the switching pulse SP repeats on/off intervals as shown in FIG. 7, the voltage detecting terminal Rd detects the current ION flowing to the ground GND through the MOS transistor when the MOS transistor is on and detects the current IOFF flowing to the ground GND through the smoothing capacitor C4 when the MOS transistor is off. As a result, the voltage detecting terminal Rd can detect total current IT that is the sum of the current ION and the current IOFF through the switch on/off intervals.

Accordingly, the voltage detecting resistor Rd can detect the current in both the on and off intervals of the switch, thereby detecting linear current unlike the triangular waveform detected in the prior art. That is, the voltage detecting resistor Rd can detect the current constantly regardless of the on/off status of the switch. Furthermore, since there is no detection blank unlike the conventional LED driving circuit of a backlight unit, more stable constant current control is enabled.

In an LED backlight unit having a plurality of LED driving circuits each for one of red (R), green (G) and blue (B) colors, any offset between the driving circuits can be reduced. Furthermore, the amplitude of the LED driving currents for R, G and B, which is adjusted to meet brightness and chromaticity coordinate set by user, can be maintained regularly.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

According to the present invention as set forth above, the LED driving circuit of a backlight unit in use for an LCD panel has an improvement in driving current detection, by which driving current of a light source of the backlight unit such as LEDs can be controlled at a constant current and thus be stabilized.

What is claimed is:

1. A Light Emitting Diode (LED) driving circuit of a backlight unit for driving an LED array which includes a plurality of LEDs connected in series, comprising:
    a switch connected between an input of direct voltage and a ground to switch the direct voltage according to a switching pulse;
    a rectifying diode connected between a connecting node and one terminal of the LED array to rectify driving voltage supplied according to switching operation of the switch, the connecting node connecting the input of the direct voltage with the switch;
    a smoothing capacitor having one terminal connected to a cathode of the rectifying diode and the other terminal connected to a ground;
    a voltage detecting resistor connected between the other terminal of the LED array connected to the ground and the other end of the smoothing capacitor to detect voltage from the current flowing to the ground; and
    a Pulse Width Modulation (PWM) controlling part for controlling on/off status of the switching according to the switching pulse, wherein the switching pulse has a duty ratio determined according to a preset internal reference voltage and the voltage detected by the voltage detecting resistor.

2. The LED driving circuit of a backlight unit according to claim 1, wherein the switch comprises a Metal Oxide Semiconductor (MOS) transistor having a drain connected to the input of the direct voltage, a source connected to the ground and a gate for receiving the switching pulse.

3. The LED driving circuit of a backlight unit according to claim 2, wherein the PWM controlling part includes:
    a comparator for comparing the preset internal reference voltage with the voltage detected by the voltage detecting resistor; and
    a controller for determining the duty ratio according to a comparison result by the comparator and providing the switching pulse having the determined duty ratio to the gate of the MOS transistor.

4. The LED driving circuit of a backlight unit according to claim 2, wherein the voltage detecting resistor has a connecting terminal connected to the other terminal of the smoothing capacitor and to a detecting terminal of the PWM controlling part to detect current flowing through the MOS transistor to the ground.

5. The LED driving circuit of a backlight unit according to claim 2, wherein the voltage detecting resistor has a connecting terminal connected to the other terminal of the smoothing capacitor and to a detecting terminal of the PWM controlling part to detect current flowing through the smoothing capacitor to the ground.

6. The LED driving circuit of a backlight unit according to claim 2, wherein the voltage detecting resistor has a connecting terminal connected to the other terminal of the smoothing capacitor and to a detecting terminal of the PWM controlling part to detect current flowing through the MOS transistor to the ground when the MOS transistor is on and to detect current flowing through the smoothing capacitor to the ground when the MOS transistor is off.

* * * * *